United States Patent [19]
Jarrett

[11] 4,213,156
[45] Jul. 15, 1980

[54] SYSTEM FOR THE PHASE LOCKING SYNTHESIZED HIGH FREQUENCY PULSES TO A LOW FREQUENCY SIGNAL

[75] Inventor: Douglas G. Jarrett, Altamonte Springs, Fla.

[73] Assignee: Exxon Research & Engineering Co., Florham Park, N.J.

[21] Appl. No.: 899,273

[22] Filed: Apr. 24, 1978

[51] Int. Cl.² .......................... H04N 1/36; H03B 3/06
[52] U.S. Cl. .................................. 358/275; 331/1 A; 358/264; 358/267
[58] Field of Search ............... 331/1 A; 358/264, 267, 358/275

[56] References Cited

U.S. PATENT DOCUMENTS

| | | | |
|---|---|---|---|
| 3,458,835 | 7/1969 | Saeger | 358/264 |
| 3,622,703 | 11/1971 | Ricketts | 358/267 |
| 3,872,397 | 3/1975 | Hanneman | 331/1 A |
| 4,044,383 | 8/1977 | Vandling | 358/264 |
| 4,092,576 | 5/1978 | Michner | 358/275 |
| 4,146,908 | 3/1979 | Vandling | 358/275 |

*Primary Examiner*—Howard W. Britton
*Attorney, Agent, or Firm*—Norman L. Norris

[57] ABSTRACT

A source of clock pulses is coupled to a synthesizer of higher frequency pulses which comprises a frequency divider which is reset in response to each of the higher frequency pulses. A lower frequency square wave signal is applied to circuitry for generating blanking pulses and low frequency pulses to be inserted periodically between the higher frequency pulses after the blanking pulses are applied to the synthesizer.

9 Claims, 5 Drawing Figures

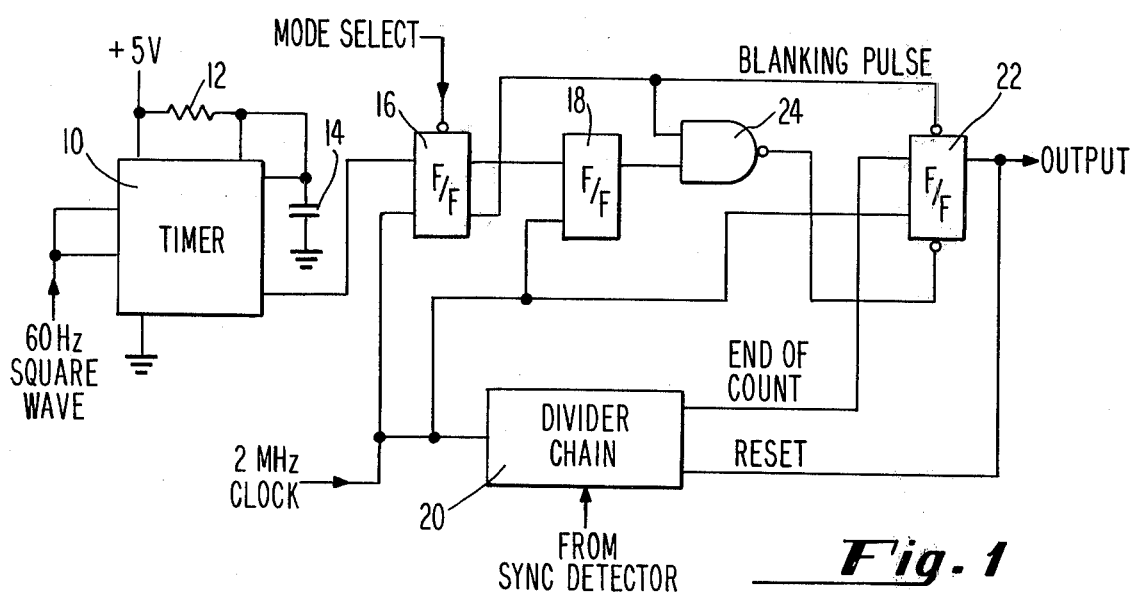
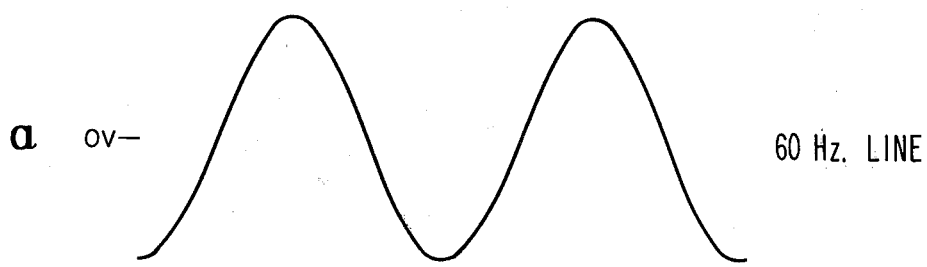
a   0v—   60 Hz. LINE
b   INPUT U1
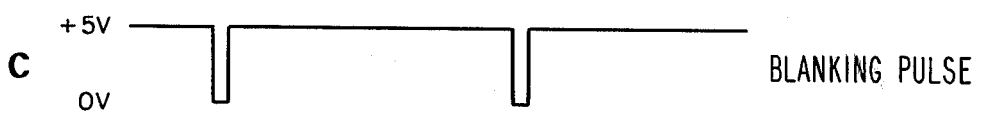
c   BLANKING PULSE
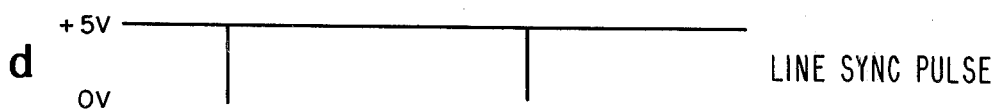
d   LINE SYNC PULSE
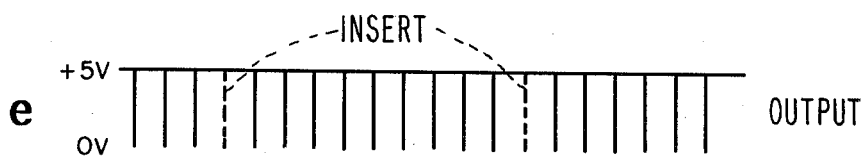
e   OUTPUT
Fig. 2

SYSTEM FOR THE PHASE LOCKING SYNTHESIZED HIGH FREQUENCY PULSES TO A LOW FREQUENCY SIGNAL

BACKGROUND OF THE INVENTION

This invention relates to a system for phase locking a low frequency signal to a synthesized higher frequency signal of a type which may be utilized in the scanning drive of a facsimile system.

In some facsimile transceivers such as the QWIP Systems 1200, it is desirable to synchronize the scanning of the facsimile transmitter with the scanning of the facsimile receiver so as to assure alignment of the margin on the copy or facsimile which corresponds with the margin on the original transmitted document. In order to achieve such synchronism, the transmitter and receiver are initially driven at substantially different scanning speeds or frequencies until a first degree of synchronism is achieved. Subsequently, the facsimile transmitter and receiver are driven at closer but still different scanning speeds and frequencies until such time as a more substantial degree of synchronism is achieved. Once the more substantial degree of synchronism is achieved, the same scanning speed or frequencies are utilized at both the transmitter and the receiver.

The foregoing synchronization technique is described in copending application Ser. No. 676,369 filed Apr. 12, 1976, now U.S. Pat. No. 4,044,383. As disclosed therein, various drive frequencies are generated for synchronization purposes and applied to a synchronous scanning motor. In copending application Ser. No. 622,215, now U.S. Pat. No. 4,092,576 filed Oct. 14, 1975 and application Ser. No. 622,214 filed Oct. 14, 1975, now U.S. Pat. No. 4,146,908, DC motors are utilized with speed control provided by a phase locked loop which locks the frequency of a tachometer feedback signal to a reference signal which may be generated by a crystal oscillator before synchronization is achieved and the AC power line signal after synchronization is achieved.

The AC line reference signal is generated by a phase locked loop comprising a voltage controlled oscillator, a frequency divider and a phase comparator. The phase comparator compares the phase and frequency of the VCO output as divided by the frequency divider with an AC line reference signal. The AC line reference signal has a frequency which is equal to the frequency of the line voltage multiplied by the divisor of the frequency divider.

A phase locked loop is generally characterized by a substantial number of components at some cost. These components and costs are attributable to the use of a phase comparator, a voltage controlled oscillator and a filter.

SUMMARY OF THE INVENTION

It is an object of this invention to provide apparatus for locking a synthesized high frequency signal to a low frequency signal without utilizing a phase locked loop.

It is a further object of this invention to provide apparatus for phase locking a synthesized high frequency signal to a low frequency signal while avoiding the cost and components associated with a phase locked loop.

It is a further object of this invention to provide such apparatus for phase locking a synthesized higher frequency signal to a lower frequency signal which may be utilized in the scanning drive of a facsimile system so as to assure synchronous operation between a transmitter and a receiver.

In accordance with these and other objects, a preferred embodiment of the invention comprises a system including a source of clock pulses and a synthesizer of a higher frequency signal which is intermediate in frequency between the clock pulses and a lower frequency signal to which the higher frequency signal is to be phase locked. The synthesizer which is coupled to the source of clock pulses comprises frequency dividing means which is reset in response to each cycle of the higher frequency signal. Means responsive to the lower frequency signal generates a signal to be inserted between cycles of the higher frequency signal. The inserted signal is characterized by a frequency equal to the lower frequency signal and resets the frequency dividing means.

In the preferred embodiment of the invention, the higher frequency signal comprises pulses and the lower frequency signal also comprises pulses which are inserted between the higher frequency pulses.

The means responsive to the lower frequency signal may include blanking means coupled to the synthesizer for periodically blanking the higher frequency pulses when the lower frequency pulses are inserted. The blanking means as well as the means responsive to the lower frequency signal for generating the lower frequency pulses may be selectively enabled or inhibited.

In the preferred embodiment of the invention, the system for phase locking the synthesized higher frequency pulses to the lower frequency inserted pulses is incorporated in a facsimile system comprising read or write transducer means, means for scanning a document or copy medium with the transducer means and motor means coupled to the scanning means. The drive means for the motor means incorporates the phase locking system to control the speed of the scanning means as a function of the frequency of the inserted pulses. The lower frequency pulses may be generated from the AC power line voltage. In a particularly preferred embodiment of the invention, synchronization means are provided for generating a signal representing relative synchronization between the scanning means of the facsimile system and a remotely located system. The means adjust the frequency dividing means so as to control the frequency of the higher frequency pulses as the facsimile system approaches synchronizm with the remotely located system. Both the blanking means and the means for inserting pulses may be selectively enabled at various stages of synchronizm so as to permit the use of the clock pulses for synchronism at one stage during synchronization and a signal phase locked to AC line which is synthesized from the clock pulses during another stage of synchronization.

BRIEF DESCRIPTION OF THE DRAWINGS

FIG. 1 is a schematic diagram of a preferred embodiment of the invention;

FIG. 2 illustrates waveforms which are useful in describing the operation of the embodiment of FIG. 1;

DETAILED DESCRIPTION OF A PREFERRED EMBODIMENT

Figure 5:
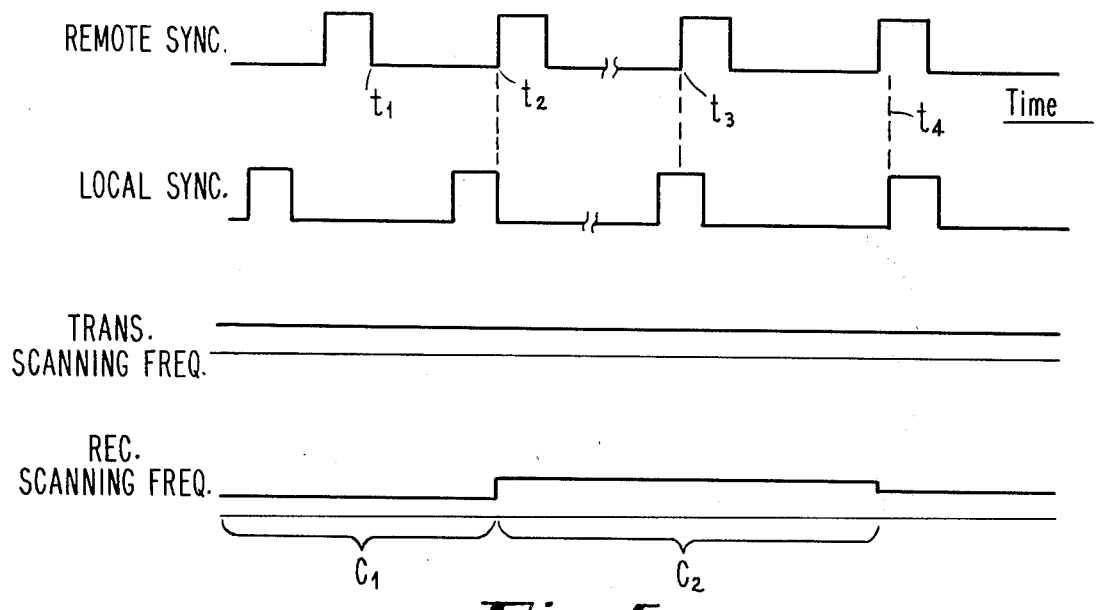
FIG. 5 is a diagram utilized in explaining the synchronization achieved by the circuitry of FIG. 4 when utilized in conjunction with the embodiment shown in FIG. 1.

Referring to FIG. 1, a system is disclosed for phase locking a lower frequency reference signal supplied by a 60 Hz. power line of the power grid to a crystal controlled frequency synthesizer of a higher frequency signal of 480 Hz. The 60 Hz. reference signal which is transformed to a square wave is applied to the input and reset pins of a suitable timer chip 10 such as the NE555 manufactured by Signetics so as to generate pulses at a frequency of 60 Hz. at the output pin. The values of a resistor 12 and a capacitor 14 associated with the chip 10 are chosen so as to allow the output pulse to be shorter in duration than the square wave input. The 60 Hz. pulses are then applied to the data input of a D-type flip-flop 16. A second D-type flip-flop 18 having a data input coupled to the Q output of the flip-flop 16 generates a 60 Hz. pulse at the Q output thereof which is delayed by exactly 1 clock pulse.

In accordance with this invention, the 60 Hz. pulses are now inserted between and phase locked to higher frequency pulses in the following manner.

The source of clock pulses is coupled to a frequency divider chain 20 which generates an output pulse at a frequency of 480 Hz., i.e., higher than the 60 Hz. frequency, but less than the 2 MHz. clock frequency. The higher frequency pulses from the divider 20 are applied to yet another D-type flip-flop 22 at the data input thereof and strobed through to the Q output in response to clock pulses applied to the clock input of the flip-flop 22. The lower frequency 60 Hz. pulses are phase locked to these higher frequency pulses of 480 Hz. by inserting the 60 Hz. pulse between two of the 480 Hz. pulses in place of a blanked 480 Hz. pulse. This is accomplished by applying the 60 Hz. pulse frequency through a NAND gate 24 to the preset input of the flip-flop 22. The resulting output pulse from the flip-flop 22 will reset the divider chain 20 so as to assure that the next end-of-count pulse from the divider chain 20 which is applied to the data input of the flip-flop 22 will occur at the same interval as the interval between other pulses synthesized by the divider chain 20.

When inserting the 60 Hz. pulse between the 480 Hz. pulses, it is necessary to blank the 480 Hz. pulse which would otherwise occur in that interval. For this purpose, the $\bar{Q}$ output of the flip-flop 16 is coupled to the clear input of the flip-flop 22.

In accordance with another important aspect of this invention, the frequency synthesizer provided by the divider chain 20 may operate phase locked to a 60 Hz. line frequency or it may operate phase locked to the 2 MHz. clock pulse source independent of the 60 Hz. line frequency. In this connection, a mode select signal may be applied to the clear input of the flip-flop 16. When the mode select signal is high, the synthesized signals from the divider chain 20 are phase locked to the 2 MHz. clock pulse source. When the mode select signal is low, the 480 Hz. signal synthesized by the divider chain 20 is phase locked to the 60 Hz. line frequency.

Referring to FIG. 2, waveform a depicts the 60 Hz. line frequency which is transformed to a 60 Hz. square wave as shown in waveform b which is applied to the timer 10. The blanking pulse generated at the $\bar{Q}$ output of the flip-flop 16 is shown at waveform c. Waveform d depicts the 60 Hz. pulse which is synchronized to the 60 Hz. line frequency and applied to the clear input of the flip-flop 22 for insertion between the 480 Hz. pulse as shown in waveform e where the dotted pulses depict the inserted pulse. As clearly shown in waveform e, every eight 480 Hz. pulses from the divider chain 20 will be blanked and replaced by the inserted pulse with subsequent 480 Hz. pulses phase locked to the inserted 60 Hz. pulses.

Figure 3:
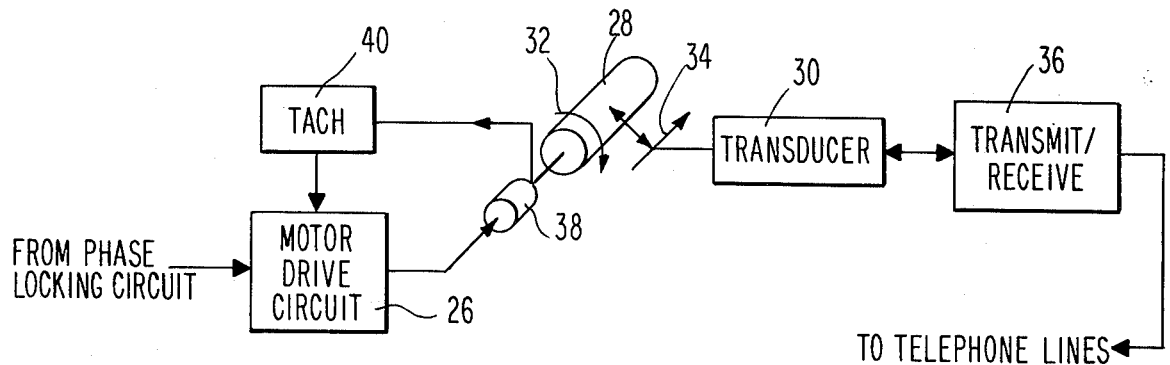
FIG. 3 is a block diagram of the embodiment shown in FIG. 3 as utilized in a facsimile transceiver system.

The output from the circuit shown in FIG. 1 as depicted in waveform e of FIG. 2 may be utilized as the input to a motor drive circuit 26 of the facsimile system shown in FIG. 3. The facsimile system includes a rotatable drum 28 which is scanned by a transducer 30 while the drum rotates as depicted by the arrow 32 and the transducer moves as depicted by the arrow 34 in a linear path along the rotating drum. The transducer may comprise an optical pick-up for detecting dark/light variations of a document mounted on the drum 28 or the transducer may comprise a stylus for writing or marking a copy medium mounted on the drum. In both cases, the transducer 30 is coupled to a transmit/receive circuit 36 which is connected to a suitable communications link such as the telephone lines.

In order to utilize the phase locked signal generated by the circuit of FIG. 1 and shown in waveform e of FIG. 2, the motor drive circuit 26 which is coupled to a motor 36 associated with the drum 28 compares the phase of the phase locked pulses to tachometer pulses generated by a tachometer 40. In other words, the tachometer pulses 40 are compared with pulses which are phase locked to the 60 Hz. line frequency when the circuit of FIG. 1 is operating in the phase locked line frequency mode. Of course, the circuit of FIG. 1 may also be utilized in conjunction with a facsimile system of FIG. 3 when the circuit of FIG. 1 operates in a mode which is locked to the source of clock pulses. Although details of the motor drive circuit 26 have not been disclosed herein, such a motor drive circuit is disclosed in detail in copending application Ser. No. 622,214 filed Oct. 14, 1975, now U.S. Pat. No. 4,146,908, assigned to the assignee of this invention and incorporated herein by reference.

Figure 4:
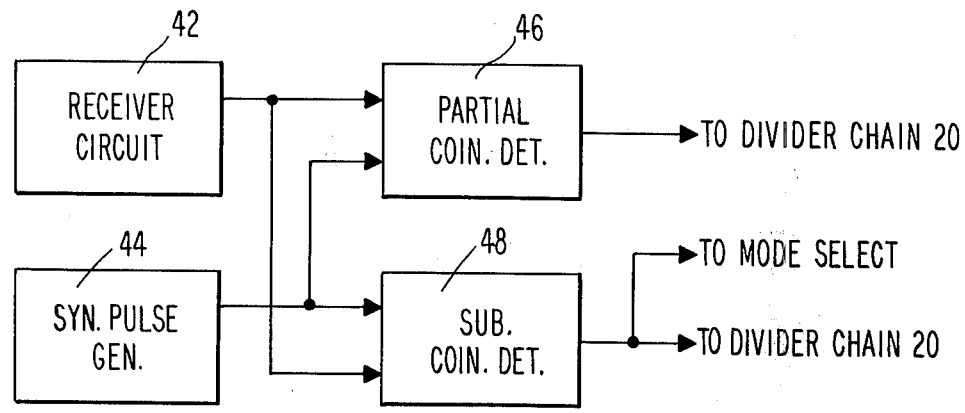
FIG. 4 is a block diagram of a synchronizing circuit for a facsimile transceiver which may be utilized in conjunction with the embodiment of the invention shown in FIG. 1.

A combination of both 60 Hz. line lock and clock pulse lock modes may be utilized during the synchronization of a facsimile system such as that shown in FIG. 3 with a remotely located facsimile system. As shown in FIG. 4, such a synchronizing circuit may comprise means for detecting the coincidence between a remotely generated synchronizing pulse as produced by the output of a receiver circuit 42 and a locally generated synchronizing pulse as produced by the output of a sync pulse generator 44. The degree of synchronizm between these locally generated and remotely generated synchronizing pulses is determined by a partial coincidence detector 46 and a substantial coincidence detector 48. The output of the partial coincidence detector 46 and the substantial coincidence detector 48 are then applied to control the frequency division of the divider chain 20 so as to adjust the drive frequency to achieve and maintain synchronization.

The degree of coincidence may also be utilized to change the mode of operation from a phase lock to the 2 MHz. clock to a phase lock to the line frequency as follows.

As shown in FIG. 5, the transmitted sync pulse is leading the locally generated sync pulse before time $t_1$. Accordingly, the transmitter scanning frequency is substantially different from the receiver scanning frequency so as to allow the scanning drums of the remote and local facsimile systems to approach synchronization. During this period in time, the mode select signal at the output of the substantial coincidence detector 48 is high so as to lock the frequency synthesizer comprising the divider chain 20 as shown in FIG. 1 to the 2 MHz. clock pulses which is indicated by the period $c_1$ in the diagram representing the receiver scanning frequency in FIG. 5.

At time $t_2$, the remotely generated and the locally generated sync pulses have approached a first degree of coincidence, i.e., partial coincidence, which is detected by the partial coincidence detector. Since the local sync pulse still lags the remote sync pulse, the receiver scanning frequency is increased relative to the transmitter scanning frequency. However, the mode select output from the substantial coincidence detector 48 remains high such that the frequency synthesizer still operates synchronized to the clock pulse source during the period $c_2$ in the scanning frequency diagram of FIG. 5.

At time $t_3$, the lead/lag relationship has not changed between the remotely generated synchronizing pulse and the locally generated synchronizing pulse. Accordingly, the receiver scanning frequency remains the same and the synthesizer continues to be phase locked to the source of clock pulses during period $c_2$.

Finally, at time $t_4$, the lead/lag relationship between the remotely generated synchronizing pulse and the locally generated synchronizing pulse changes corresponding to substantial coincidence as detected by the substantial coincidence detector 48. At that moment in time, the scanning frequency at the receiver is changed by adjusting the frequency division occuring at the divider 20. Simultaneously, the mode select signal goes low so as to phase lock the divider chain 20 as shown in FIG. 1 to the 60 Hz. line frequency.

Although the details of the synchronization circuitry shown in FIG. 4 have not been disclosed, such details may be found in copending application Ser. No. 676,369 filed Apr. 12, 1976, now U.S. Pat. No. 4,044,383, assigned to the assignee of this invention and incorporated herein by reference.

From the foregoing, it should be appreciated that a change in mode which results in changing from a synthesized output which is phase locked to the clock pulse source to a synthesized output which is phase locked to the line frequency will produce a one-time error of up to 20 milliseconds. It should be emphasized that this is a one-time error which will not recur. Conversely, changing from phase lock to AC line to phase lock to clock pulse source will produce no such error.

Although a preferred embodiment of the invention has been shown and described, it will be understood that other modifications and embodiments will occur to those of ordinary skill in the art which will fall within the true spirit and scope of the invention as set forth in the appended claims.

What is claimed is:

1. A system for phase locking synthesized higher frequency pulses to a low frequency signal comprises:
    a source of clock pulses;
    a synthesizer of said higher frequency pulses coupled to said source, said synthesizer comprising dividing means reset in response to each of said higher frequency pulses; and
    insertion means responsive to said low frequency signal for generating pulses to be periodically inserted between said higher frequency pulses, said inserted pulses having a frequency equal to said low frequency signal, said inserted pulses also resetting said dividing means.

2. The system of claim 1 wherein said insertion means includes blanking means coupled to said synthesizer for periodically blanking said higher frequency pulses to permit insertion of said inserted pulses.

3. The system of claim 2 further comprising means for selectively enabling the blanking means and said means for inserting pulses.

4. The system of claim 2 wherein said blanking means comprises means for generating blanking pulses from a square wave having a frequency equal to said low frequency signal.

5. The system of claim 4 wherein said insertion means delays said inserted pulses until the end of said blanking pulses.

6. A facsimile system comprising:
    transducer means;
    means for scanning a document or copy medium with said transducer means;
    motor means coupled to said scanning means; and
    drive means coupled to said motor means, said drive means comprising
        a source of clock pulses;
        a synthesizer of said higher frequency pulses coupled to said source, said synthesizer comprising dividing means reset in response to each of said higher frequency pulses; and
        insertion means responsive to said low frequency signal for generating pulses to be periodically inserted between said higher frequency pulses, said inserted pulses having a frequency equal to said low frequency signal, said inserted pulses also resetting said dividing means.

7. The facsimile system of claim 6 further comprising:
    means for generating a signal representing the relative synchronism between said scanning means of said facsimile system and a scanning means of a remotely located system; and
    means for adjusting said dividing means so as to control the frequency of said higher frequency pulses as said facsimile scanning system approaches synchronism with said remotely located system.

8. The facsimile system of claim 7 wherein said low frequency signal comprises an AC power line and said means responsive to said low frequency signal includes blanking means coupled to said synthesizer for periodically blanking said higher frequency pulses when said inserted pulses are inserted.

9. The facsimile system of claim 7 further comprises means for selectively enabling said blanking means and said insertion means.

* * * * *